United States Patent [19]

Anselmi et al.

[11] Patent Number: 5,503,529
[45] Date of Patent: Apr. 2, 1996

[54] TURBINE BLADE HAVING ANGLED EJECTION SLOT

[75] Inventors: Gregory J. Anselmi, Fairfield, Ohio; David A. Brown, Nuthall, England

[73] Assignee: General Electric Company, Cincinnati, Ohio

[21] Appl. No.: 352,415

[22] Filed: Dec. 8, 1994

[51] Int. Cl.$^6$ .................................................. F01D 5/08
[52] U.S. Cl. .................................. 416/97 R; 416/90 R
[58] Field of Search .......................... 416/90 R, 97 R, 416/97 A

[56] References Cited

U.S. PATENT DOCUMENTS

| | | | |
|---|---|---|---|
| 3,045,965 | 7/1962 | Bowmer | 416/90 R |
| 3,672,787 | 6/1972 | Thorstenson | 416/97 A |
| 3,807,892 | 4/1974 | Frei et al. | 416/97 R |
| 3,819,295 | 6/1974 | Hauser et al. | 416/97 R |
| 3,891,348 | 6/1975 | Auxier | 416/97 |
| 4,021,139 | 5/1977 | Franklin | 416/97 R |
| 4,180,373 | 12/1979 | Moore et al. | 416/97 R |
| 4,229,140 | 10/1980 | Scott | 416/97 R |
| 4,292,008 | 9/1981 | Grosjean et al. | 415/115 |
| 4,303,374 | 12/1981 | Braddy | 416/97 R |
| 4,500,258 | 2/1985 | Dodd et al. | 416/97 R |
| 4,601,638 | 7/1986 | Hill et al. | 416/97 R |
| 4,653,983 | 3/1987 | Vehr | 416/97 R |
| 4,859,147 | 8/1989 | Hall et al. | 416/97 R |
| 5,102,299 | 4/1992 | Frederick | 416/97 R |
| 5,176,499 | 1/1993 | Damlis et al. | 416/97 R |
| 5,246,341 | 9/1993 | Hall et al. | 416/97 R |
| 5,271,715 | 12/1993 | Zelesky et al. | 416/97 R |
| 5,368,441 | 11/1994 | Sylvestro et al. | 416/97 A |
| 5,370,499 | 12/1994 | Lee | 416/97 A |

Primary Examiner—Thomas E. Denion
Assistant Examiner—Mark Sgantzos
Attorney, Agent, or Firm—Andrew C. Hess; Patrick R. Scanlon

[57] ABSTRACT

A gas turbine engine turbine airfoil includes first and second opposite sidewalls joined together at leading and trailing edges and extending from a root to a tip thereof. The sidewalls have respective outer surfaces over which is flowable combustion gases during operation. The sidewalls are spaced apart to define an internal flow passage for receiving a cooling fluid. A plurality of ejection slots are arranged in a column through the first sidewall and have flow inlets for receiving cooling fluid from the internal flow passage and ejecting the fluid from respective flow outlets along the outer surface. At least some of the ejection slots are inclined at an acute ejection angle which varies in magnitude for preferably matching the respective inclination of combustion gas streamlines flowable over the airfoil surface.

10 Claims, 2 Drawing Sheets

TURBINE BLADE HAVING ANGLED EJECTION SLOT

BACKGROUND OF THE INVENTION

A gas turbine engine such as that used for powering an aircraft in flight includes a combustor which generates hot combustion gases, with the discharge therefrom flowing through a high pressure turbine nozzle which directs the combustion gases to a row of turbine rotor blades which extract energy therefrom for rotating a disk and shaft joined thereto for typically powering a compressor of the engine. The first stage turbine rotor blades receive the hottest combustion gases in the engine and are therefore typically hollow and provided with various structures used for providing effective cooling thereof for ensuring useful operating lives therefor.

The turbine rotor blades typically include serpentine flow passages therein and various cooling holes through the airfoil pressure side, suction side, or tip as required. Cooling air is provided to the blade by bleeding a portion of relatively cool compressor air and suitably channeling it through the blade dovetail and into the blade for supplying the cooling structures therein. However, any air bled from the compressor which is used for cooling purposes is not therefore used in the combustion process which necessarily decreases the overall efficiency of the engine. It is therefore desirable to use as little as possible of compressor bleed flow for cooling purposes.

One type of cooling hole found in either rotor blades or stator vanes is a pressure side, ejection slot extending parallel to the engine centerline which is typically also perpendicular to the longitudinal or radial axis of the blade airfoil. Cooling air is discharged from the inside of the airfoil and out the ejection slots in an aft direction for providing film cooling of the trailing edge region of the airfoil. Recent analytical evaluation of the combustion gas flow field flowing over the pressure side of the airfoil and visual inspection of airfoils operated in an engine have shown that the combustion gas streamlines migrate both radially outwardly and radially inwardly from the pitchline or mid-span of the airfoil which has led to improvements in airfoil cooling in accordance with the present invention described below.

SUMMARY OF THE INVENTION

A gas turbine engine turbine airfoil includes first and second opposite sidewalls joined together at leading and trailing edges and extending from a root to a tip thereof. The sidewalls have respective outer surfaces over which is flowable combustion gases during operation. The sidewalls are spaced apart to define an internal flow passage for receiving a cooling fluid. A plurality of ejection slots are arranged in a column through the first sidewall and have flow inlets for receiving cooling fluid from the internal flow passage and ejecting the fluid from respective flow outlets along the outer surface. At least some of the ejection slots are inclined at an acute ejection angle which varies in magnitude for preferably matching the respective inclination of combustion gas streamlines flowable over the airfoil surface.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
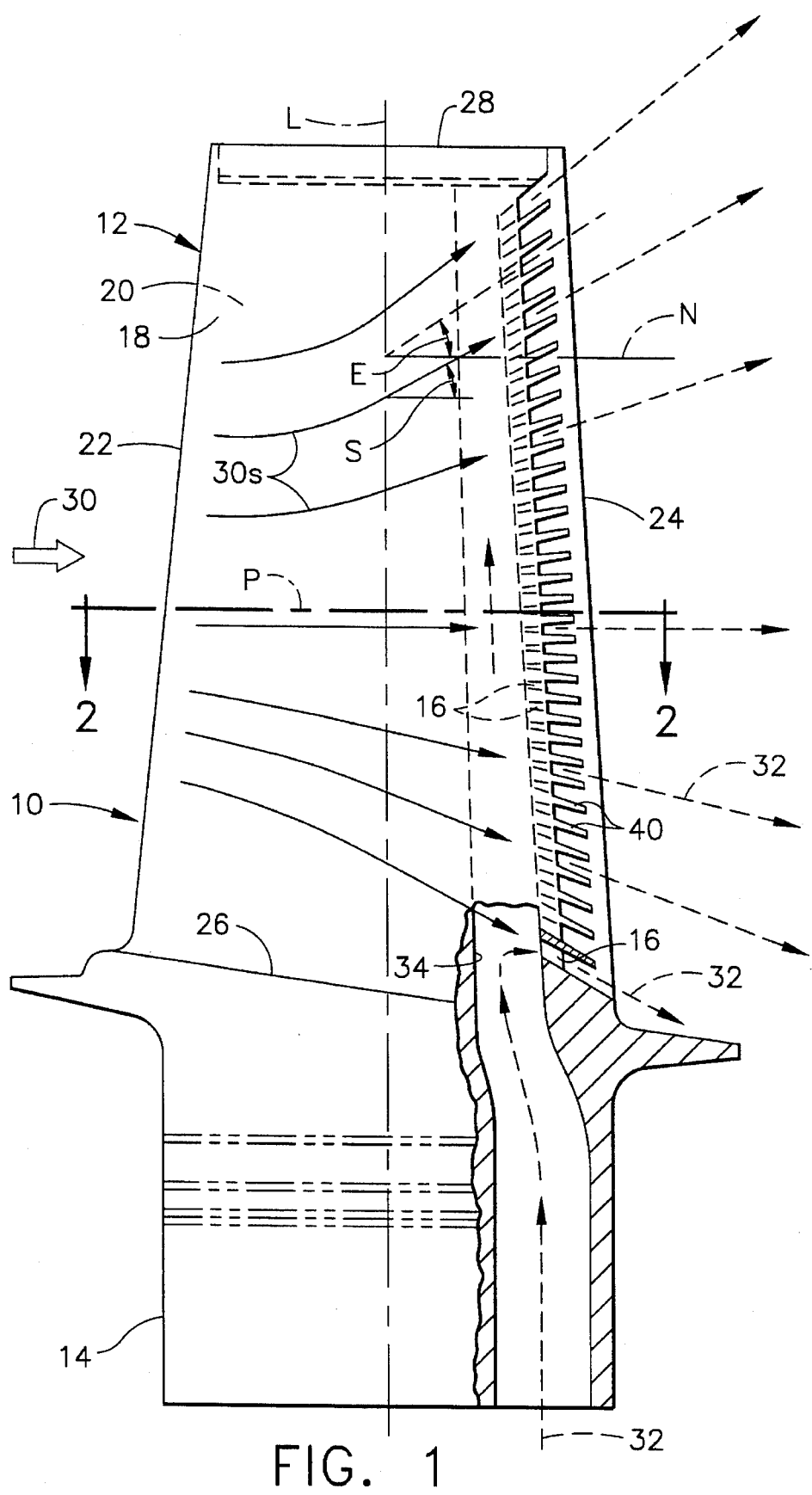
FIG. 1 is an elevational, partly sectional view of an exemplary gas turbine engine turbine rotor blade having an airfoil with a plurality of ejection slots disposed therein in accordance with one embodiment of the present invention.

Illustrated in FIG. 1 is an exemplary gas turbine engine turbine rotor blade 10 having an airfoil 12, and a conventional dovetail 14 integrally joined thereto for mounting the airfoil 12 to a turbine rotor disk (not shown) in a conventional manner. The airfoil 12 is hollow and includes a plurality of ejection slots 16 which provide enhanced cooling in accordance with the present invention. Although the ejection slots 16 are illustrated in the airfoil 12 of an exemplary turbine rotor blade 10, they may also be used in an analogous airfoil 12 of a conventional stator vane (not shown).

Figure 2:
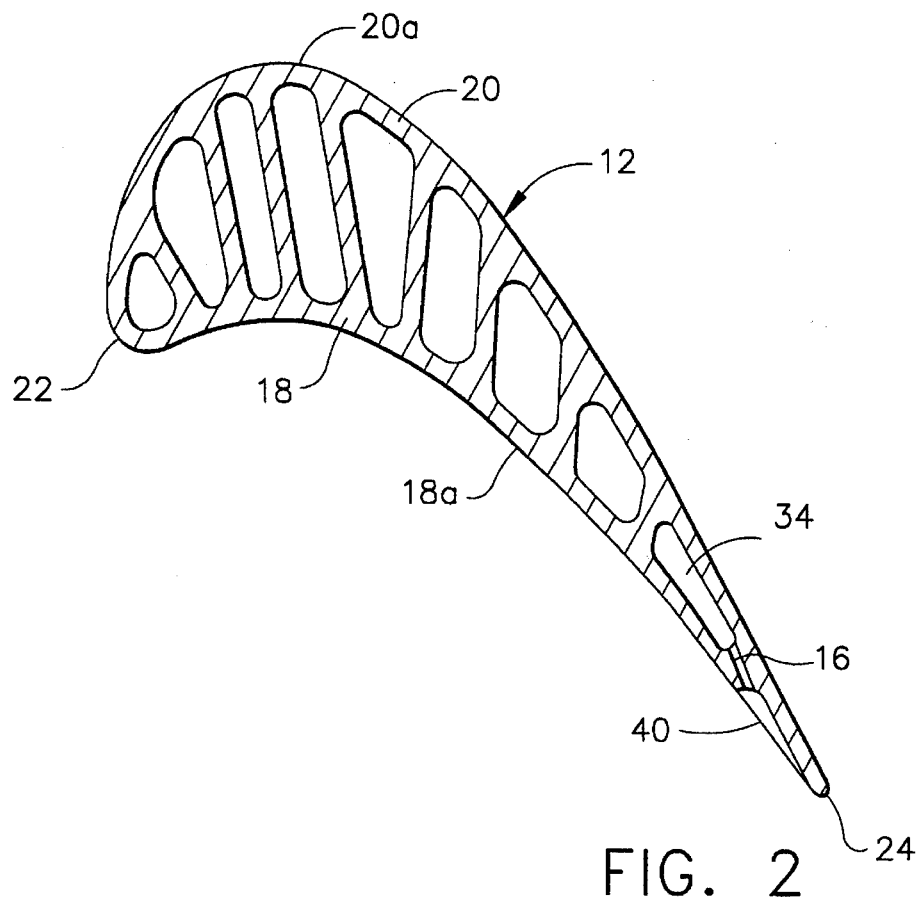
FIG. 2 is a radial sectional view through the airfoil illustrated in FIG. 1 and taken generally along line 2—2.

The airfoil 12 as illustrated in FIGS. 1 and 2 includes first and second opposite sidewalls 18, 20 joined together at an upstream end thereof at a leading edge 22 and at an opposite, downstream end at a trailing edge 24. The airfoil 12 extends along a longitudinal axis L from a root 26 thereof to a tip 28 thereof. The longitudinal axis L is also referred to as a radial axis since the airfoil 12 is typically mounted in a radial orientation in a gas turbine engine with the root 26 being at the radially inner end of the airfoil 12, and the tip 28 being at the radially outer end thereof. The axial or centerline axis of the engine typically extends perpendicularly or normal to the radial or longitudinal axis L of the airfoil 12.

Hot combustion gases 30 are generated in a conventional combustor (not shown) and suitably channeled downstream for flow over the airfoil 12 from the leading edge 22 to the trailing edge 24, and then typically flow downstream to additional turbine stages. The airfoil first sidewall 18 is generally concave and has a first outer surface 18a which defines a pressure side of the airfoil 12. The second sidewall 20 is generally convex and includes a second outer surface 20a which defines a suction side of the airfoil. In operation, the combustion gases 30 flow downstream over both sides of the airfoil 12 which extracts energy therefrom for rotating the rotor disk to which they are joined by the dovetails 14.

The first and second sidewalls 18, 20 are spaced apart from each other for defining one or more internal flow passages for receiving a suitable cooling fluid or air 32 shown in dashed line. The cooling air 32 is conventionally bled from the compressor of the engine (not shown) and suitably channeled to the airfoil 12 for providing effective cooling thereof. As shown in FIG. 2, many exemplary internal passages are provided in the airfoil 12 with an exemplary trailing edge flow passage 34 disposed adjacent to the trailing edge 24 being specifically identified for use in describing an exemplary embodiment of the present invention. The other internal flow passages illustrated in FIG. 2 may take any conventional form and include various conventional turbulators and cooling apertures (not shown) as desired.

As shown in FIG. 1, the several ejection slots 16 are longitudinally spaced apart from each other and arranged in a generally linear column adjacent to and upstream of the trailing edge 24, and in this exemplary embodiment extend through the first or pressure sidewall 18. An exemplary one of the ejection slots 16 is shown in more particularity in FIG. 3, with each ejection slot 16 having a flow inlet 36 at one end thereof disposed in flow communication with the trailing edge flow passage 34 for receiving a respective portion of the cooling fluid 32 therefrom, and a respective flow outlet 38 at an opposite end thereof along or in the first outer surface 18a for ejecting the cooling fluid 32 therefrom in an aft direction. Referring again to FIG. 1, at least some of the ejection slots 16 in accordance with the present invention, are inclined at an acute ejection angle E which is relative to a normal, i.e. normal line N, to the longitudinal axis L, with the ejection angle E varying in magnitude for respective ones of the ejection slots 16.

As indicated above, recent computational analysis of the fluid flow field of the combustion gases 30 over the airfoil 12, and visual inspection of exemplary airfoils run in operation, indicate a migration of the combustion gas streamlines, designated 30s, from the pitchline P towards the root 26 and the tip 28 of the airfoil 12 along the airfoil pressure sidewall 18. The pitchline P is disposed at the mid-span of the airfoil 12 between the root 26 and the tip 28 and is an exemplary intermediate section of the airfoil 12 disposed longitudinally therebetween. The airfoil first and second outer surfaces 18a, 20a have suitably concave and convex profiles for creating the respective pressure and suction sides of the airfoil 12 for extracting energy from the combustion gases 30 during operation. The configurations of these outer surfaces 18a, 20a when rotated in the environment of the gas turbine engine, cause the exemplary migration of the streamlines 30s on the pressure side, i.e. first sidewall 18, of the airfoil 12 as shown in FIG. 1. The streamlines 30s near the pitchline P are generally parallel to the engine axial centerline and generally perpendicular to the longitudinal axis L of the airfoil 12. Each of the streamlines 30s has a respective streamline angle S which is measured relative to a normal to the longitudinal axis L, with the streamline angle S being zero when the streamline 30s is normal to the axis L.

As shown in FIG. 1, the streamline angles S increase in magnitude in a positive sense from the pitchline P towards the tip 28, and increase in magnitude in a negative sense from the pitchline P towards the root 26. In prior art designs, typical ejection slots analogous to the slots 16 are all oriented at the same angle which is normal to the longitudinal axis L and parallel to the axial axis. Accordingly, when the inclined streamlines 30s meet the ejected cooling fluid 32 with a differential angle therebetween, mixing losses are created and the effectiveness of the film cooling air developed downstream therefrom is reduced.

In accordance with the present invention, it is desirable to match the ejection flow from the ejection slots 16 with the respective streamlines 30s by preselecting the ejection angles E for substantially matching respective ones of the streamline angles S. In this way, mixing losses between the combustion gases 30 flowing over the airfoil pressure side 18 and the cooling fluid 32 being discharged from the ejection slots 16 may be reduced. The effectiveness of the film cooling air established downstream of the ejection slots 16 is correspondingly improved. Accordingly, either lower metal temperatures may be achieved at the trailing edge region or a reduction in the requirements of the cooling fluid 32 may be achieved. Reducing the cooling air requirements improves engine specific fuel consumption.

In the exemplary embodiment illustrated in FIG. 1, the ejection angle E for the ejection slots 16 located near the pitchline P is generally zero in magnitude so that the ejected cooling fluid 32 matches the flow direction of the corresponding streamlines 30s which are generally normal to the longitudinal axis L. The ejection angle E for respective ones of the ejection slots 16 increases in magnitude in a positive sense from the intermediate section or pitchline P toward the tip 28, with each ejection angle E being larger in turn than the preceding radially inner ejection slot 16. The ejection angles E also increase in magnitude in a negative sense (opposite to the ejection angles E above the pitchline P) from the pitchline P toward the root 26, with each succeeding ejection angle E being larger in turn than the preceding ejection angle E radially thereabove. In the exemplary embodiment illustrated in more particularity in FIG. 3, each of the ejection slots 16 has a race-track or oblong configuration with two substantially flat sides and two semi-circular sides, the centerline of which is disposed at the preferred ejection angle E as described above. The slot 16 may be conventionally formed such as being cast into the airfoil 12 during conventional manufacturing.

Figure 3:
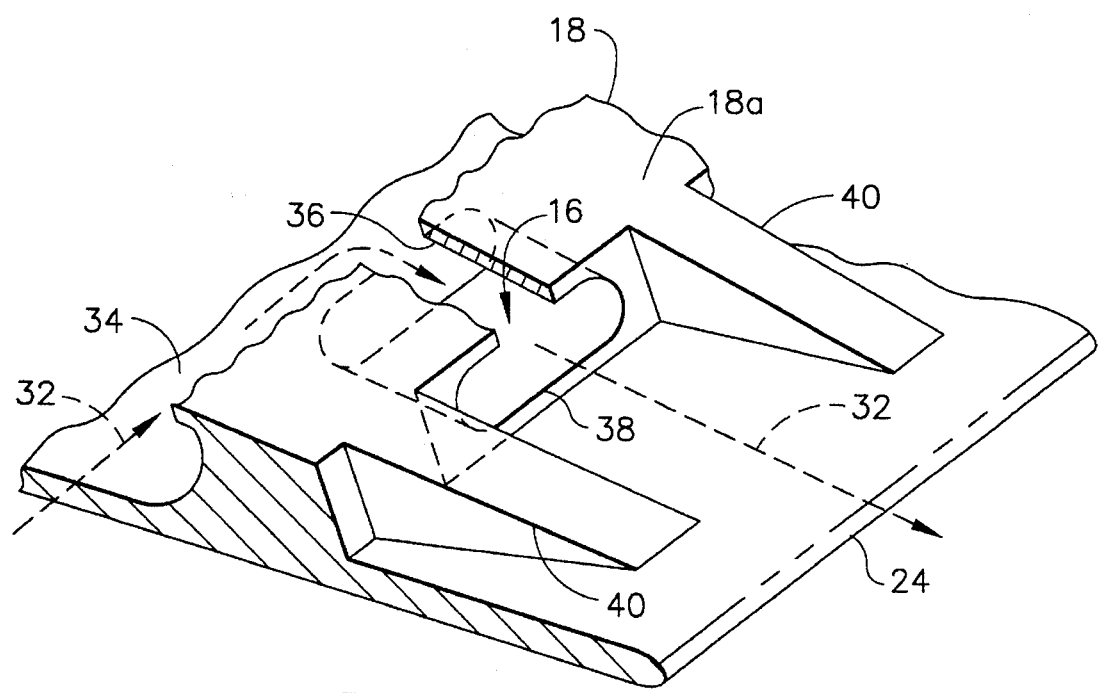
FIG. 3 is a perspective view of a portion of an exemplary one of the ejection slots illustrated in FIG. 1.

As shown in FIGS. 1–3, the flow passage 34 is disposed adjacent to the trailing edge 24 in this exemplary embodiment, with the ejection slots 16 also being disposed adjacent to the trailing edge 24 at a suitable distance upstream therefrom for establishing film cooling. As shown in FIG. 3, the cooling fluid 32 is ejected from the ejection slots 16 in a downstream direction along the pressure side, i.e. the first sidewall 18, for establishing film cooling in the trailing edge region up to the trailing edge 24 of the airfoil 12. A plurality of tapered ribs 40 are spaced longitudinally apart between respective ones of the ejection slots 16 and extend downstream therefrom in decreasing height to adjacent the trailing edge 24 for directing aft the cooling fluid 32 from the ejection slots 16. Each of the ribs 40 is preferably inclined substantially equally with respective adjacent ones of the ejection slots 16 for assisting in matching the ejection angle E with the corresponding streamline 30s flowing thereover.

Although the invention has been described with respect to a preferred embodiment, it may take various configurations wherein the slots 16 are suitably inclined for matching the inclination of the streamlines 30s flowable thereover. The ejection slots 16 are illustrated in FIG. 3 in a typical trailing edge film cooling arrangement with the ejection slot outlets 38 being disposed in an aft facing step for establishing the cooling film of air flowable downstream therefrom to the trailing edge 24. In an alternate embodiment, the aft facing step and/or ribs 40 may be eliminated, with the ejection slot outlets 38 being formed coplanar with the outer concave surface 18a instead of in the step generally perpendicularly thereto. The ejection slots 16 may also be located at various other locations around the surface of the airfoil 12 where beneficial for matching the discharge angle of the cooling fluid 32 with the streamlines of the combustion gas flowable thereover.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A gas turbine engine turbine airfoil comprising:
    first and second opposite sidewalls joined together at one end at a leading edge and at an opposite end at a trailing edge and extending along a longitudinal axis from a root thereof to a tip thereof, said first and second sidewalls having respective first and second outer surfaces over which is flowable combustion gases;

said first and second sidewalls being spaced apart for defining an internal flow passage for receiving a cooling fluid therein;

a plurality of longitudinally spaced apart ejection slots arranged in a column and extending through said first sidewall, and having respective flow inlets at one end thereof disposed in flow communication with said flow passage for receiving said cooling fluid therefrom, and respective flow outlets at opposite ends thereof along said first sidewall outer surface for ejecting said cooling fluid therefrom; and wherein as least some of said ejection slots are inclined at an acute ejection angle relative to a normal to said longitudinal axis, with said ejection angle varying in magnitude for respective ones of said ejection slots for diverging said respective ejection slots from said inlets to said outlets thereof.

2. An airfoil according to claim 1 wherein said ejection angle increases in magnitude at respective ones of said ejection slots in turn.

3. An airfoil according to claim 2 further comprising an intermediate section disposed longitudinally between said root and said tip, and said ejection angle for respective ones of said ejection slots increases in magnitude in a positive sense from said intermediate section towards said tip, and increases in magnitude in a negative sense towards said root.

4. An airfoil according to claim 2 wherein:

said airfoil first and second sidewalls are generally concave and convex, respectively, and said first and second outer surfaces define pressure and suction sides, respectively, for causing streamlines of said combustion gases to flow over said airflow first outer surface at varying streamline angles relative to a normal to said longitudinal axis; and said ejection angles are preselected for substantially matching respective ones of said streamline angles.

5. An airfoil according to claim 4 further comprising an intermediate section disposed longitudinally between said root and said tip, and said ejection and streamline angles for respective ones of said ejection slots and streamlines increase in magnitude in a positive sense from said intermediate section towards said tip, and increase in magnitude in a negative sense towards said root.

6. An airfoil according to claim 2 wherein said flow passage is disposed adjacent to said airfoil trailing edge, and said ejection slots are disposed adjacent to said airfoil trailing edge.

7. An airfoil according to claim 6 wherein said airfoil first sidewall is generally concave and said first outer surface defines a pressure side; and said ejection slots are effective for ejecting said cooling fluid along said pressure side at said trailing edge.

8. An airfoil according to claim 7 further comprising a plurality of tapered ribs spaced longitudinally apart between respective ones of said ejection slots, and extending downstream therefrom to adjacent said trailing edge for directing aft said cooling fluid from said ejection slots, said ribs being inclined substantially equally with respective adjacent ones of said ejection slots.

9. An airfoil according to claim 8 further comprising an intermediate section disposed longitudinally between said root and said tip, and said ejection angle for respective ones of said ejection slots increases in magnitude in a positive sense from said intermediate section towards said tip, and increases in magnitude in a negative sense towards said root.

10. An airfoil according to claim 9 in combination with a dovetail integrally joined to said airfoil at said root for mounting said airfoil to a turbine rotor disk.

* * * * *